United States Patent [19]
Reiher

[11] 4,077,110
[45] Mar. 7, 1978

[54] METHOD FOR MAKING CANDLES

[76] Inventor: Wilfred L. Reiher, 4701 N. 55th St., Phoenix, Ariz. 85018

[21] Appl. No.: 634,348

[22] Filed: Nov. 24, 1975

Related U.S. Application Data

[63] Continuation-in-part of Ser. No. 520,536, Nov. 4, 1974, abandoned.

[51] Int. Cl.[2] .......................... B23P 3/00; B23P 25/00
[52] U.S. Cl. ..................................... 29/458; 29/527.3; 264/115; 264/123; 264/126; 264/134; 264/155; 264/250; 264/322; 264/325; 264/346; 264/DIG. 66; 264/77
[58] Field of Search ................. 264/250, 77, 123, 126, 264/322, DIG. 66, 115, 134, 155, 157, 325, 346; 425/803; 29/458, 527.3

[56] References Cited

U.S. PATENT DOCUMENTS

| | | | |
|---|---|---|---|
| 1,622,347 | 3/1927 | Rhoads | 264/322 |
| 1,657,172 | 1/1928 | Monroe | 264/77 |
| 2,145,887 | 2/1939 | Moss et al. | 264/77 |
| 2,618,019 | 11/1952 | Orsini | 264/77 |
| 2,761,803 | 9/1956 | Breitenbach | 264/152 |
| 3,702,495 | 11/1972 | Renoe | 264/109 |
| 3,744,956 | 7/1973 | Hess | 431/288 |

FOREIGN PATENT DOCUMENTS

| | | | |
|---|---|---|---|
| 470,792 | 8/1937 | United Kingdom | 264/77 |

*Primary Examiner*—Robert F. White
*Assistant Examiner*—James R. Hall
*Attorney, Agent, or Firm*—Herbert E. Haynes, Jr.

[57] ABSTRACT

A method for making candles from solid wax including the steps of: sizing, compressing, drilling, and inserting of a wick. Further steps which may be included are coloring and/or adding other candle specializing ingredients such as deodorizing, scenting, insect repellants, and the like.

10 Claims, 11 Drawing Figures

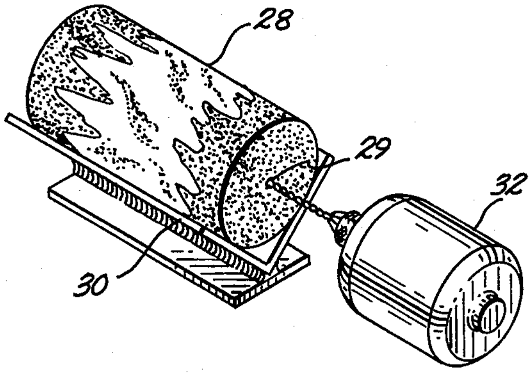
Fig-8
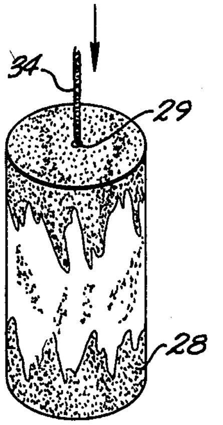
Fig-9
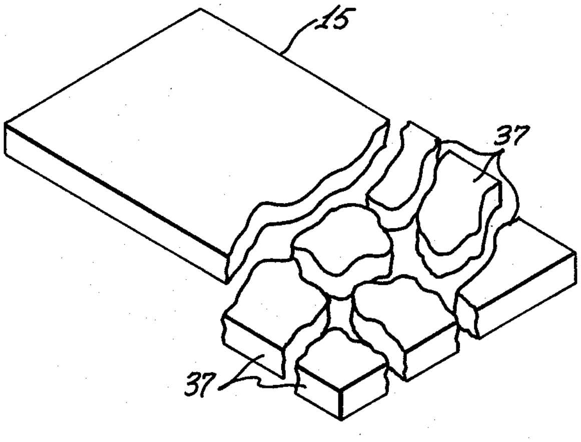
Fig-10
Fig-11
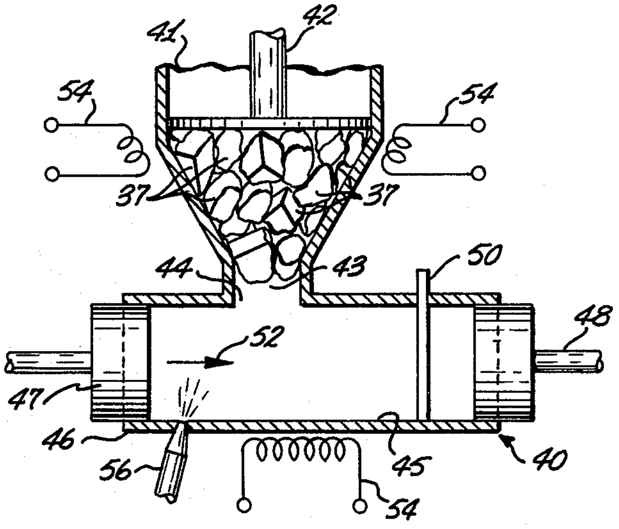

METHOD FOR MAKING CANDLES

CROSS-REFERENCE TO RELATED APPLICATION

This application is a continuation-in-part of a copending U.S. patent application entitled, METHOD FOR MAKING CANDLES, Ser. No. 520,536, filed Nov. 4, 1974, by the same inventor, and now abandoned.

BACKGROUND OF THE INVENTION

1. Field of the Invention

This invention relates to a method of making candles from solid wax.

2. Description of the Prior Art

The candle making art has long employed the same basic techniques of casting, dipping, or otherwise forming candles from molten wax. Besides being a somewhat messy operation, these long used techniques are relatively costly due to the amount of apparatus and skill required, the time factor, and the constant vigil which must be maintained due to the fire hazard inherent in such techniques. First of all, suitable machinery is needed for heating and maintaining the wax in a molten state and for subsequent handling of the molten wax such as pouring into molds. Secondly, large numbers of molds and suitable water and/or other refrigerating equipment as suited for the particular technique, must be used in order to achieve a worthwhile production rate due to the extensive time required to cool the wax before it can be removed from the molds and is ready for further handling such as packaging.

Further, it is difficult, if not impossible, to accurately axially center the wick within candles formed by these molten wax techniques, and wax shrinkage along with air entrapment presents problems. Heating of the wax to achieve the necessary molten state causes expansion of the wax and the intake of relatively large quantities of air. During cooling of the wax shrinkage occurs and the cooling must not be allowed to occur too rapidly or the air will be trapped or occluded within pockets or voids in the candle body.

These problems are well known in the candle making art, and some attempts have been made to do away with the need for heating and cooling of the wax to eliminate, or at least reduce, the problems associated with those basic techniques.

One such attempt is fully disclosed in U.S. Pat. No. 2,885,727 issued to A. Wright on May 12, 1959. Briefly, the Wright Patent discloses the compressing of finely divided wax particles in a suitable mold to form a rudimentary candle body. A wick is placed within the mold so that the candle body is compressed around the wick. The rudimentary candle body is then compressed a second time in another mold to reduce surface flaws and to form the desired peripheral contours.

While eliminating the undesirable and expensive heating and cooling required of the molten wax candle forming techniques, the above described method of compresssing finely divided wax particles has resulted in other problems. Among these problems is the need for taking solid bulk wax and forming minute particulate wax thereof. Complex machinery and time consuming methods are needed to form the wax particles which range in size from 0.5 microns to 300 microns. Not only is the forming of the wax particles difficult and costly, but the handling thereof is difficult. Thus, the problems of forming and handling of particulate wax has played an important part in keeping such a technique from becoming widely accepted. Further, during compression molding of particulate wax, occluded air is a problem which has not been completely solved. Occluded air will form pockets within the candle body and "blow holes" can appear in the peripheral surface thereof. The two separate steps of compression disclosed in the above referenced U.S. patent are aimed at reducing the occluded air problem. However, the need for two compressing steps and the accompanying apparatus has raised the cost of such candles and has not completely resolved the problem of occluded air.

Specialized candles having additives such as coloring, scenting, deodorizing and the like, have traditionally been made by mixing the additives directly into the molten wax. This technique distributes the additives evenly throughout the entire candle body and therefore relatively large quantities of these additives must be used to obtain any degree of effectiveness. This not only raises the cost of such specialized candles, it usually results in a candle having inferior burning characteristics. This inferior quality results from the additives acting as impurities in the wax with the degree of contamination depending upon the particular additive material and the quantity. During combustion of a candle, ideal burning characteristics are achieved when the rate of wax consumption equals the rate at which the solid wax is melted into molten wax. Any additives existing within the wax are in suspension and will migrate into the pores of the wick during combustion. This action will interfere with the capillary action of the wick and will diminish or completely cut off the flow of wax and oxygen to the wick. The wick may then be extinguished either by the lack of fuel and oxygen, or by being drowned in molten wax which is not being consumed at a rapid enough rate. This excess quantity of molten wax may also cause guttering of the candle, that is, drainage of the wax down the side of the candle.

Therefore, a need exists for a new and improved method for making candles which eliminates some of the problems of the prior art and substantially reduces other of these problems.

SUMMARY OF THE INVENTION

In accordance with the present invention, a new and useful method for making candles is disclosed as including the step of sizing raw or bulk solid wax into either a single piece of predetermined size and shape, or into a plurality of randomly shaped pieces the size of which must be kept at or above a predetermined minimum. When a single piece of solid wax is employed in the present method, it is sized so that its mass is approximately equal to the desired mass of the finished candle. When multiple pieces are employed, the minimum mass of the individual pieces is approximately one ounce. In either event the sizing step must result in a piece or pieces which will fit into a mold. The next steps in the method of the present invention are to insert the piece or pieces of solid wax into a cylindrical mold and exert a compressive force thereon to move the solid wax into conformity with the interior configuration of the mold, and a cylindrical candle body results. After removing the candle body from the mold, a wick receiving hole is formed therein, such as by drilling, and a suitable wick is inserted therein.

Thus, the problems associated with the prior art techniques employing molten wax have been eliminated by the method of the present invention as the entire process is accomplished with the wax being in the solid state. Also, the problems of forming and handling of particulate wax and the problem of occluded air associated with the prior art techniques of compression molding of wax particles have been solved by the method of the present invention by the specific sizing of the solid wax piece or pieces.

Additional steps for making specialized candles may be included in the above described steps of the method of the present invention. Such steps may include the application of suitable additives to the exterior of the wax piece or pieces prior to the step of applying a compressing force thereon. Such additives may include decorative coloring materials, scenting perfumes, deodorizing chemicals, insect repellents, and the like. By applying the additives to the exterior of the wax piece or pieces and then applying the compressing force, the additives will be caused to penetrate somewhat into the surface of the candle body thus achieving the desired specialization of the candle. However, since the additives are applied locally rather than being distributed equally throughout the candle body, as is the case in prior art specialized candles, smaller amounts of the additive materials can be used and contamination of the wax is substantially reduced.

Accordingly, it is an object of the present invention to provide a new and useful method of making candles.

Another object of the present invention is to provide a new and useful method of making candles from solid wax.

Another object of the present invention is to provide a new and useful method of making candles from solid wax in a single compression molding operation.

Another object of the present invention is to provide a new and useful method of making a candle by compression molding of a single piece of solid wax having a predetermined weight and configuration.

Another object of the present invention is to provide a new and useful method of making a candle by compression molding of a plurality of pieces of solid wax, with those pieces each having a minimum size.

Another object of the present invention is to provide a new and useful method of making candles in which specializing additive materials are applied to the exterior of the solid wax which during compression molding of the wax will penetrate into the surface of the wax.

The foregoing and other objects of the present invention, as well as the invention itself, will become more fully understood from the following description when read in conjunction with the accompanying drawings.

BRIEF DESCRIPTION OF THE DRAWINGS

FIG. 8 is an isometric view illustrating the step of forming a wick receiving hole in the candle body.

FIG. 9 is an isometric view illustrating the step of inserting a wick into the wick receiving hole of the candle body.

FIG. 10 is an isometric view illustrating another form of accomplishing the sizing step of the method of the present invention.

FIG. 11 is a sectional elevational view of an alternate form of apparatus in which the compression molding of the solid wax may be accomplished, and in which the step of applying the specializing additive materials may be accomplished.

DESCRIPTION OF THE PREFERRED EMBODIMENTS

Figure 1:
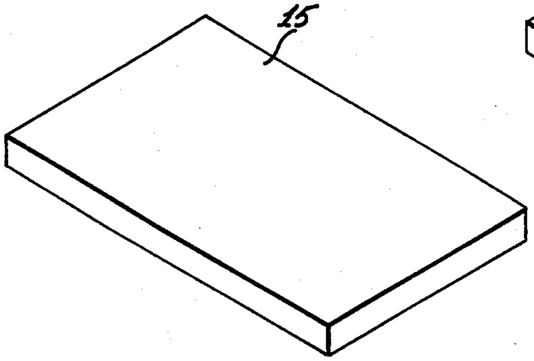
FIG. 1 is an isometric view of a slab of wax prior to being processed in accordance with the steps of the method of the present invention.

Referring more particularly to the drawings, FIG. 1 illustrates a slab 15 of bulk solid wax as it appears prior to processing in accordance with the method of the present invention. The slab configuration is a customary way that bulk or raw wax is supplied by the manufacturer and will typically measure 12 inches wide, 20 inches long and 1½ inches thick. The slab 15 may be of any of the various well known types of waxes suitable for the candle making art, and such a slab will weigh approximately 11 pounds.

Figure 2:
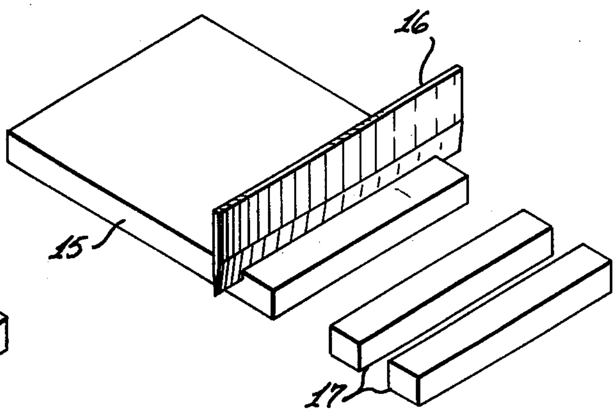
FIG. 2 is an isometric view showing the first step of the present method as including sizing of the solid wax.

FIG. 2 shows the first step of the present method wherein a suitable knife means 16 is used for sizing of the slab 15 into single pieces or chunks 17. In this embodiment of the present invention, the pieces 17 are sized to a predetermined weight as determined by the size of the candle to be produced. For example, if a candle of relatively large size is being produced, such as a 1 pound candle about 6 inches long by 3 inches in diameter, then the slab 15 will be sized into 11 equal parts so that each of the pieces 17 will weigh about 1 pound, and a single slab can produce 11 candles.

It will be noted that this sizing step simply involves transverse cutting of the slab 15 into the pieces 17, and the resulting pieces 17 are shaped as rectangular parallelepipeds whose bases are rectangles. The only objectives of this sizing step is to insure that the proper amount of solid wax is used and to configure that wax as simply and quickly as possible so that it will fit into a mold as will be hereinafter described. Thus, it will be seen that this simple sizing step replaces the need for forming molten wax in one prior art technology, and eliminates the need for forming particulate wax in another prior art technology.

Figure 3:
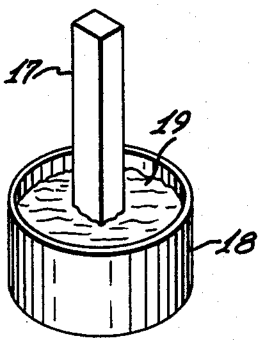
FIG. 3 is an isometric view showing the step of applying a specializing additive material to the exterior of the solid wax.

It is often desirable to produce specialized candles, i.e., ones that are colored, scented or otherwise treated to achieve particular results. In prior art forming of such candles, specializing additives such as coloring materials, scenting perfumes, and the like are added to molten wax. Therefore, the next step of the present invention is optional and is only included when it is desired to produce specialized candles. This step may be defined as applying at least one specializing additive to at least one portion or localized area of the solid wax piece 17. As seen in FIG. 3, this step is preferrably accomplished by dipping one or both of the opposite ends of the piece 17 into a suitable vat 18. The vat 18 contains a mixture 19 of molten wax having one or more of the specializing additives therein.

Figure 4:
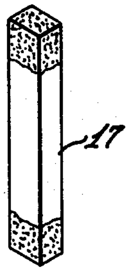
FIG. 4 is an isometric view showing the solid wax having the specializing additive material applied thereto.

Many forms of specializing additives may be used to accomplish the above described step, and such additives may be used singularly or in various combinations as desired. By way of example, a coloring dye may be added to the molten wax within the vat 18 so that dipping one or both ends of the wax piece 17 will result in a thin layer of colored wax being applied thereto as shown in FIG. 4. If desired, other specializing additives may be used in place of or in conjunction with the coloring dye. Examples of other types of specializing additives are scenting perfumes, deodorizing chemicals, insect repellents, and the like.

Figure 5:
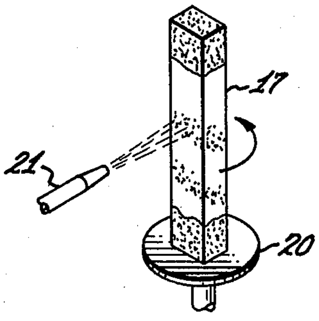
FIG. 5 is an isometric view showing the step of applying the specializing additive material to the exterior of the solid wax in another fashion which may be used instead of the method shown in FIG. 4 or in conjunction therewith.

FIG. 5 illustrates another method of accomplishing the previously described step of applying at least one specializing additive to at least one portion of the solid wax piece 17. It should be noted that the method shown in FIG. 5 may be used in lieu of, or in conjunction with, the method illustrated in FIG. 3. FIG. 5 illustrates the solid wax piece 17 as being rotated on a suitable revolving structure means 20, and the specializing additive being applied thereto by spray means 21 to achieve a spiraling or substantially even disposition of the additive material. This application technique is particularly well suited for achieving decorative effects when the specializing additive contains a coloring material. An additive particularly well suited for this type of spraying technique is gold, bronze, or other metallic power mixed with acrylic lacquer and thinners.

As will hereinafter be described in detail, when the specializing additives contain a coloring agent, the dipping method of application and the spraying method of application will produce substantially different aesthetic effects upon forming of the solid wax piece 17 into a candle body.

Special multi-color effects can be achieve by varying the above techniques of applying the specializing additives. For example, dipping the opposite ends of the solid wax piece 17 in different colors, dipping each of the corners of one or both ends of the piece 17 in different colors, subsequent dipping to apply a second color partially over a first color and the like. Similar multicolor effects can be achieved with the spraying technique by simply spraying different colors in desired areas and desired patterns.

Figure 6:
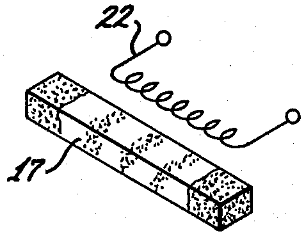
FIG. 6 is an isometric view illustrating an optional step of tempering of the solid wax.

The next step of the present invention is only needed when necessitated by unusual circumstances. It has been found that compression molding of solid wax is satisfactorily accomplished when that solid wax is at normal room temperature of about 60° to 70° F or higher. Thus, if the solid wax is below normal room temperature, tempering thereof with heat may be necessary to insure satisfactory results. Therefore, the tempering step of the method of the present invention is optional, and if needed may be accomplished with any suitable heating means 22 as shown in FIG. 6. It is suggested that this heating may be accomplished in any convenient environment which is at normal room temperature such as a storage room annd therefore normal production schedules need not be hindered.

Figure 7:
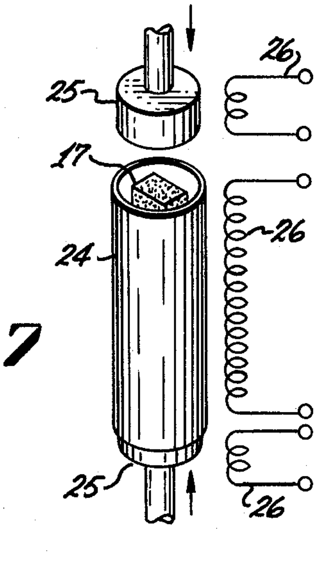
FIG. 7 is an isometric view illustrating a form of apparatus which may be used to perform the step of compressing the solid wax in a mold to form a candle body.

After the solid wax piece 17 is sized as described above, specialized if desired and tempered if needed, the next step is the compression molding of the piece 17 from its non-candle configuration of a rectangular parallelepiped whose bases are rectangles into a conventional cylindrical candle body. As shown in FIG. 7, the solid wax piece 17 is placed within a suitable cylindrical mold 24 and compressed therein by reciprocally operable rams 25. Such action will force the solid wax piece 17 into conformity with the internal configuration of the mold 24. It has been found that if the mold 24 and rams 25 are heated, such as with suitable heating elements 26, removal of the formed candle body may be easily accomplished without galling, which may possibly occur, and a perfectly smooth peripheral surface will result. It has been determined that this heating of the mold 24 and rams 25 should be considerably below the melting point of the particular type of solid wax being employed. For example, if the wax being employed has a melting point of about 155° F, heating of the mold 24 and rams 25 to approximately 110° F. will achieve the desired result of softening the peripheral surface of the candle body.

The length of time that is required for the compression molding step is relatively short, with that time being only the time needed for movement of the rams. Thus, the time that the wax is within the mold 24 should be no more than about 8 seconds, depending on the particular equipment being used, and such a short period of time will not allow the wax to be heated to any degree by the heated mold 24 and rams 25. Thus, only the outermost periphery of the candle body will be softened by the heating elements 26, and that softened surface will cool and harden immediately upon removal of the candle body from the mold.

It should be noted that the above described compression molding step produces a cylindrical candle body having minute fracture lines within the body. These fracture lines add to the aesthetics of the candle by resulting in a glowing of the body during combustion. Also, this technique produces a candle having increased density as compared to molten wax produced candles thus, longer burning times result from comparable sizes.

FIG. 8 shows the cylindrical candle body 28, which was formed from the single solid wax piece 17 in the previously described step, as having a wick receiving hole 29 formed axially therein. For this purpose, the candle body 28 is placed within a suitable trough 30 which precisely aligns the longitudinal axis of the candle body 28 with a drilling mechanism 32. Movement of the trough 30 toward the drilling mechanism 32, or vice versa, will form the wick receiving hole 29 in the candle body 28.

FIG. 9 illustrates a length of wick 34 being inserted into the wick receiving hole 29 of the candle body 28. Any suitable prewaxed wicking material may be employed for this purpose. Affixing of the wick 34 within the candle body 28 will be automatically accomplished upon lighting of the candle and interim retention may be accomplished by packaging or by bending the extending end, or ends, of the wick flush with the end surface of the candle body.

An ideal mechanism for pretreating, cutting, and inserting wicking material is disclosed in U.S. Pat. No. 3,907,487, entitled, CANDLEWICK PREPARATION AND INSTALLATION APPARATUS, issued on Sept. 23, 1975 to the same inventor.

The distinctive aesthetic effects achieved by the previously described compression molding technique when colored specializing additives are applied to the solid wax piece 17 are best seen in FIG. 9. When the dipping method of applying colored specializing additives is used, the resulting candle body 28 will have the color located substantially at the ends of the candle in random hues and patterns. When the spraying technique is used, the results will be that random hues and patterns will be achieved in streaks, spots, and the like.

An advantage of the previously described application techniques of the specializing additives and the compression molding of the solid wax piece 17 is that the additives will not penetrate very deeply into the candle body. Surface penetration of the specializing additives will be approximately 1/16 of an inch, thus contamination of the wax with impurities is virtually eliminated and highly decorative or otherwise specialized candles can be produced without detrimentally effecting the burning characteristics.

FIGS. 10 and 11 illustrate modifications of some of the hereinbefore described steps of the preferred embodiment of the present invention. FIG. 10 shows the solid wax slab 15 from which a plurality of randomly sized and shaped pieces 37 are obtained.

Similar to the previously described step of sizing the slab 15 to form the pieces 17, this present modified form of sizing is accomplished so that the solid wax can be inserted into a mold. It is important that the pieces 37 not be broken or otherwise formed into excessively small pieces, for it has been found that excessively small pieces result in increased problems with occluded air. Therefore, it has been found by experimentation that the mass of each of the pieces 37 should not be less than approximately 1 ounce.

Occluded air problems result from air pockets which exist in the spaces or voids between the wax pieces prior to the exertion of the compressive force. The entrapped air must be expelled from the mold during the compression molding operation such as through orifices (not shown) formed in the rams 25. When a large number of air pockets exist, such as in the prior art technique which employs particulate wax, very high compressive forces and the time of exertion of those forces must be relatively long to insure that the entrapped air is expelled. Thus, the specific sizing steps of the present method, as previously described, results in a substantial reduction in the number of air pockets which reduces the time and force required for the compression molding operation.

As before, the solid wax pieces 37 may optionally have the specializing additives applied to the peripheral surfaces thereof by any suitable method, and those pieces 37 may be tempered if needed.

FIG. 11 illustrates, in schematic form, a type of apparatus indicated generally by the reference numeral 40, which is adapted to handle the randomly sized and shaped pieces 37 and produce cylindrical candle bodies identical with those produced in accordance with the previously described steps of the present invention. The apparatus 40 includes a hopper 41 into which a plurality of pieces 37 of solid wax are placed. A ram 42 is employed to move the wax pieces 37 downwardly toward the outlet 43 of the hopper 41 and through the inlet opening 44 in the bore 45 of a mold 46. The mold 46 has reciprocally operable opposed rams 47 and 48 which upon actuation will move toward each other to compress the wax contained within the mold 46. A suitably operable slide gate 50 is located within the bore 45 of the mold. Filling of the mold 46 is accomplished with the slide gate 50 in the closed position. The ram 42 pushes the solid wax pieces 37 into the bore 45 of the mold 46 and when the bore 45 is full, the sliding gate 50 is opened. The rams 47 and 48 are then actuated to exert the necessary compressing force on the wax within the bore 45. Upon completion of this operation, the ram 47 will continue to move in the same direction and the ram 48 is reversed. This will push the candle body 28 out of the mold 46 in the direction of the arrow 52.

The apparatus 40 may be provided with suitable heating devices 54 to heat the hopper 41, rams 47 and 48, and the mold 46, so that the solid wax pieces 37 will move easily without galling, and the candle body 28 will slide out of the mold easily and have a flawless peripheral surface.

A suitable spray device 56 may be connected to the bore 45 of the mold 46 so that specializing additives may be applied immediately prior to the step of compressing the wax within the mold. The spray apparatus 56 may be used in lieu of the previously described methods of dipping and spraying.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A method of making candles comprising the steps of:

(a) sizing a solid slab of bulk wax into a plurality of pieces of solid wax with each of said pieces having a minimum mass of approximately 1 ounce;

(b) inserting a predetermined amount of said solid wax pieces into the interior cavity of a mold;

(c) compressing said inserted amount of solid wax pieces for movement thereof into conformity with the interior configuration of said mold to form a single unitary candle body;

(d) removing said candle body from said mold;

(e) drilling a wick receiving hole in said candle body; and (f) inserting a predetermined length of wicking material into the wick receiving hole to complete making of said candle.

2. The method of claim 1 further comprising the step of, applying at least one candle specializing additive to the exterior of at least one of said solid wax pieces between steps (a) and (b).

3. The method of claim 1 further comprising the step of, applying at least one candle specializing additive to the exterior of at least one of said solid wax pieces between steps (b) and (c) by spraying the candle specializing additive from a spray device into the interior of said mold and onto at least one of said solid wax pieces.

4. The method of claim 1 further comprising the step of, heating said mold prior to step (c) to a temperature which will soften the peripheral surface of the candle body to be formed therein for facilitating removal of said candle body from said mold and for smoothing the peripheral surface thereof.

5. The method of claim 1 further comprising the step of, heating said pieces of solid wax prior to step (b) for tempering thereof to insure a uniform temperature throughout said pieces of solid wax with that temperature being at least 60° F.

6. A method of making candles comprising the steps of:

(a) cutting a slab of solid bulk candle wax to form at least one piece of solid wax having the configuration of a rectangular parallelepiped whose bases are rectangles and having a weight approximately equal to the desired weight of the finished candle;

(b) inserting said one piece of solid wax into the interior of a cylindrical mold;

(c) compressing said one piece of solid wax in said mold for movement thereof into conformity with the interior configuration of said mold to change said one piece of solid wax from said parallelepiped into a cylindrical candle body;

(d) removing said candle body from said mold;

(e) drilling a wick receiving hole axially in said candle body; and (f) inserting a predetermined length of wicking material in said wick receiving hole to complete the making of said candle.

7. The method of claim 6 further comprising the step of, applying at least one candle specializing additive to at least one area of the surface of said one piece of solid wax between steps (a) and (b).

8. The method of claim 6 further comprising the step of, dipping at least one end of said one piece of solid wax in a mixture of molten wax and at least one candle specializing additive beween steps (a) and (b) for applying said mixture to the surface of said one end.

9. The method of claim 6 further comprising the step of, spraying a liquid containing at least one candle specializing additive on at least a portion of said one piece of solid wax between steps (a) and (b) for applying said additive to the surface of said portion.

10. The method of claim 6 further comprising the step of, heating said mold prior to step (c) to a temperature which will soften the peripheral surface of the candle body to be formed therein for facilitating removal of said candle body from said mold and for smoothing the peripheral surface thereof.

* * * * *